Aug. 14, 1945.      H. C. KRONE ET AL      2,381,962
HOSE COUPLING
Filed Dec. 9, 1943
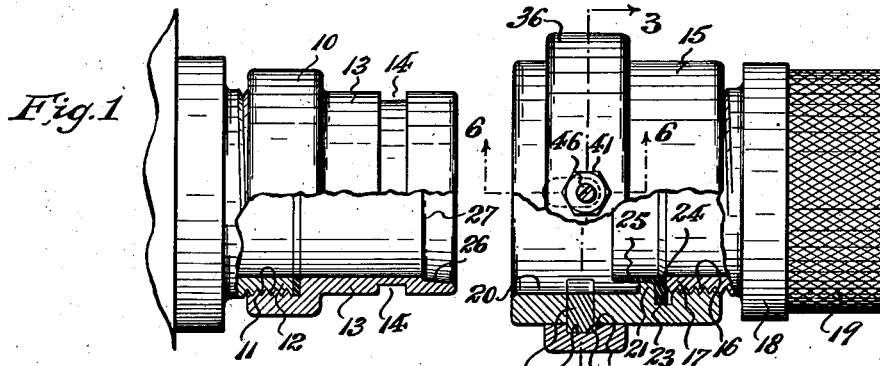
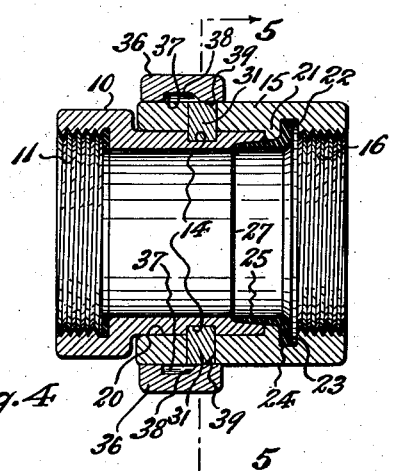
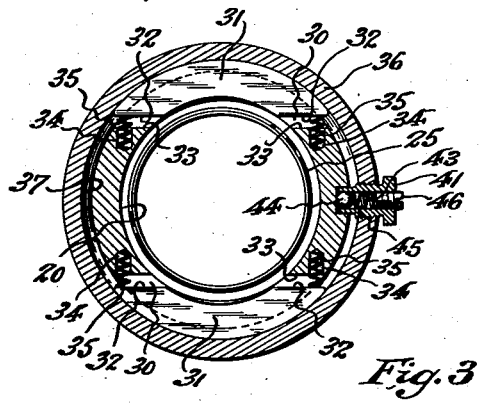
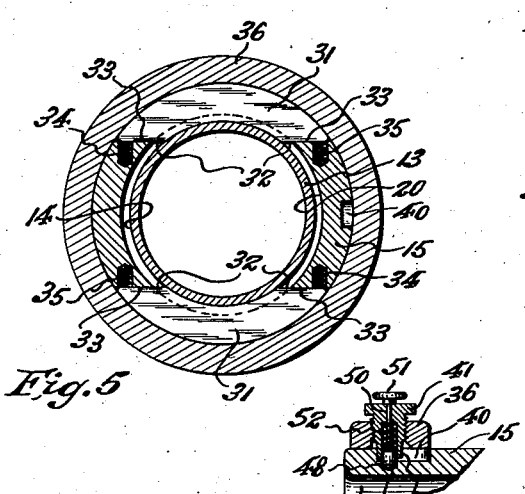
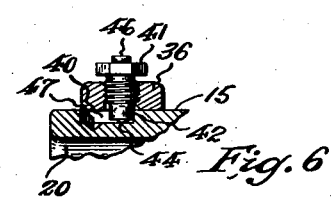
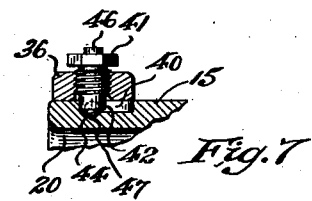
INVENTORS:
Howard C. Krone & William Meyer,
BY
George D. Richards
ATTORNEY.

Patented Aug. 14, 1945

2,381,962

UNITED STATES PATENT OFFICE 2,381,962

HOSE COUPLING

Howard C. Krone, River Edge, and William Meyer, East Orange, N. J., assignors to Wheaton Brass Works, Newark, N. J., a corporation of New Jersey Application December 9, 1943, Serial No. 513,518

5 Claims. (Cl. 285—169)

This invention relates to improvements in hose couplings; and the invention has reference, more particularly, to an improved coupling of the telescopic type, i. e. one in which its male and female members are engaged by pushing the one into the other.

This invention has for an object to provide a telescopic coupling structure having novel means for locking its male and female members, when joined together, against separation, wherein said means comprises radially movable latch means carried by the female member and adapted to engage in socket means with which the male member is provided, said latch means being spring pressed to normal initial released position, and thus so as to be normally withdrawn from the path of movement of the male member when the latter is entered in or withdrawn from the female member; and said female member being provided with an external slide ring manipulatable to engage and move the latch means to latching engagement with the male member, and to positively retain said latch means in such latching position.

The invention has for another object to provide a telescopic coupling structure of the kind mentioned, wherein the slide ring is provided with detent means for holding the same in latch means actuated position against accidental displacement.

Other objects of this invention, not at this time more particularly enumerated, will be understood from the following detailed description of the same.

An illustrative embodiment of the invention is shown in the accompanying drawing, in which:—

Fig. 1 is a side elevational view in part section of the male member of the coupling structure; and Fig. 2 is a side elevational view in part section of the female member of said coupling structure.

Fig. 3 is a cross-sectional view, taken on line 3—3 in Fig. 2, showing the latch means in normal initial released position.

Fig. 4 is a longitudinal sectional view of the male and female members of the coupling structure as operatively joined together and locked against separation; and Fig. 5 is a cross-sectional view, taken on line 5—5 in Fig. 4.

Fig. 6 is a fragmentary longitudinal sectional view showing a detent means with which the slide ring of the coupling structure is provided, said slide ring being shown retracted to latch means releasing position; and Fig. 7 is a similar view showing the slide ring advanced to latch means actuating position, and held therein by the detent means.

Fig. 8 is a fragmentary view similar to that of Fig. 7, but showing an alternative form of detent means.

Similar characters of reference are employed in the above described views, to indicate corresponding parts.

Referring to the drawing, the reference character 10 indicates the male member of the coupling structure, the same being suitably constructed to be affixed to a tank outlet, a hose section, or other fluid conduit means. For example, said male member, as shown, is provided at its rearward end with an internally screw-threaded socket 11 to receive the threaded end 12 of a tank outlet nozzle. At its forward end, the male member is provided with a spigot portion 13, usually of cylindrical shape. Formed in the external surface of said spigot portion 13 is an annular channel or latch socket 14, which is spaced inwardly from the free end thereof.

The reference character 15 indicates the female member of the coupling structure, the same being suitably constructed to be affixed to a hose section or other fluid conduit means. For example, said female member, as shown, is provided at its rearward end with an internally screw-threaded socket 16 to receive the threaded end 17 of a union member 18 connected with the end of a hose section 19. At its forward end, the female member is provided with a bell portion 20, the internal diameter of which is sized to slidingly or telescopically receive the spigot portion 13 of the male member 10. Formed in the bell portion 20, at the inner end thereof, is an internally projecting annular rib or flange 21, behind which is an annular channel or seating groove 22 which is contiguous to the rear seating face or shoulder 23 of said rib or flange 21. Disposed within said channel or seating groove 22, and against the seating face or shoulder 23, is a packing ring 24 of resilient material, the same having a forwardly extending flexible annular skirt 25. Said skirt 25 projects outwardly across the rib or flange 21 into the interior of the bell portion 20, so as to be spaced from the side walls of the latter. Said packing ring 24 is held firmly and tightly to the seating face or shoulder 23 by the extremity of the threaded end 17 of the hose union member 18 as entered in the socket 16 of the female member 15, or, if desired, a separate locking ring may be screwed into the socket 16 ahead of the end 17 of the hose union member; or independent of such other means as may be provided for attaching the female coupling member 15 to a hose or other fluid conduit means, as is well known to the art. Preferably said packing ring skirt 25 tapers in wall thickness toward its free edge, so as to be sensitively responsive to expansion by internal pressure of fluid flowing through the coupling structure. To cooperate with said packing ring skirt, the spigot portion 13 of the male coupling member is provided with an internal countersunk annular seating face 26 of conformable taper, and limited at its inner end by a shoulder 27, behind which the free edge of the packing ring skirt 25 is disposed, when entered in the end of the spigot portion 13 at the time the male coupling member is entered in the female coupling member. The internal diameter of the packing ring and its skirt is somewhat greater than the internal diameter of the spigot portion 13, and consequently said shoulder 27 protects or guards the free edge or lip of the skirt against passage of fluid beneath the latter so as to deflect the same from sealing contact with the seating face 26, and therefore the internal pressure of fluid flowing through the coupling structure is solely directed perpendicular to the internal surface of the packing ring skirt 25, whereby to press the same firmly into sealing contact with the seating face 26 of the male member spigot portion 13 with which it cooperates.

The means for locking the coupling members, when joined together, against separation comprises one or more latch pieces radially movable in transverse housing openings 30 provided in the walls of the bell portion 20 of the female member. Preferably at least two latch pieces in diametrically opposed relation are employed. Each latch piece comprises an arcuate body 31 of a width corresponding to the width of the annular latch socket 14 of the male member spigot portion 13, and of a height exceeding the wall thickness of the bell portion 20 of the female member, said body having, at its respective ends, inwardly presented flat base faces 32 disposed in a transverse plane parallel to the axis of the coupling structure. The respective ends of the housing openings 30 provided in the walls of the bell portion 20 of the female member likewise terminate in flat seating faces 33, also disposed in a transverse plane parallel to the axis of the coupling structure. Formed in the walls of the bell portion 20, to open outwardly from the flat seating faces 33 thereof, are socket cavities 34 perpendicular to the planes of the latter, and footed in said socket cavities 34 are compression springs 35 which thrust outwardly against the base faces 32 of the latch piece bodies 31.

Slidably mounted on the female coupling member 15 is a manipulatable slide ring 36. This slide ring is provided, in its internal face, with an annular latch piece receiving channel 37, the rearward wall of which is chamfered to provide an inclined cam portion 38. The external rearward margin of each latch piece body 31 is correspondingly chamfered to provide an inclined cam portion 39 cooperative with the cam portion 38 of said slide ring 36. When the slide ring 36 is retracted to latch means releasing position, its receiving channel 37 will be aligned with the latch piece bodies 31, so that the latter, under the thrust of the springs 35, will be moved bodily in outward radial direction and thus into said receiving channel 37. Such outward movement laterally withdraws the inner marginal portions of the latch piece bodies 31 out of the interior of the bell portion 20 and beyond or at least flush with the inside surfaces thereof, thus normally leaving the bell portion interior free of obstruction, so that the spigot portion 13 of the male member 10 can be freely entered or withdrawn therefrom, as the case may be (see Figs. 2 and 3).

Means is provided for both properly limiting the sliding movements of the slide ring 36, as well as to detain or hold the same against accidental withdrawal from its advanced latch means actuating position. Such means, in one form thereof, comprises an outwardly open countersunk guideway 40 formed and suitably located in the external surface of the female member 15. Threaded through said slide ring 36 is a stop screw 41, the end 42 of which is entered in said guideway 41, whereby abutment thereof against the rear end of said guideway arrests rearward movement of the slide ring 36 and determines its retracted latch means releasing position, and abutment thereof against the forward end of said guideway arrests forward movement of the slide ring and determines its advanced latch means actuating position. Said stop screw 41 is provided with an axial bore 43 in which is carried a detent ball 44 urged by a compression spring 45 toward the bottom of said guideway 40, said spring being backed by a closure screw 46 threaded into the outer end of said bore. Formed in the floor of said guideway 40 adjacent its forward end is a depressed seat 47 into which the detent ball 44 is thrust and yieldably held when the slide ring 36 is advanced to latch means actuating position, whereby to retain said slide ring in such position against accidental displacement therefrom (see Fig. 7).

If a more positive detent means is desired, a modified form thereof such as shown in Fig. 8 may be utilized, wherein, instead of a detent ball carried by the stop screw 41, a bolt piece 48 is provided to engage a correspondingly shaped bolt socket or seat 49 in the floor of the guideway 40. The bolt piece 48 is urged to holding position by a compression spring 52, and said bolt piece is provided with a pull stem 50 slidably projecting through the outer end of the stop-screw 41; said stem having a pull knob or finger piece 51 on its external end, by means of which the bolt piece 48 may be manually withdrawn from slide ring locking position.

From the above description, it will be understood that when the slide ring 36 is retracted to the limit of its rearward movement, the receiving channel 37 will be aligned with the latch piece bodies 31, so that the compression springs 35 will yieldably force the same outwardly into said receiving channel 37 of the slide ring, thus withdrawing said latch piece bodies out of the bell portion 20 of the female member, so as to leave the path of movement of the male member spigot portion 13 into said bell portion free from obstruction (see Figs. 2 and 3). With the female member thus prepared for the reception of the male member, the spigot portion 13 of the latter is slid telescopically into the bell portion 20 of said female member until it is stopped in engagement with the internal rib or flange 21 of the latter, and so as to be operatively engaged by the skirt 25 of the seal ring 24, in which position its annular latch socket 14 is aligned with and opposed to the retracted latch piece bodies 31. The male member having been thus engaged in the female member, the slide ring 36 of the latter is slid forward to the limit of its advancing movement. As the slide ring 36 is advanced, its cam 38 engages and thrusts against the cam portions 39 of the latch piece bodies 31, thereby moving said latch piece bodies radially inward against the tension of the springs 35, so that the same enter into the latch socket 14 of the male member spigot portion 13, thereby interlocking the male and female members together against separation (see Figs. 4 and 5). It will be observed, that the forward displacement of the receiving channel 37 of the slide ring 36 engages the inside surface of the slide ring body directly with the outside surface of the latch piece bodies 31, so that the latter are firmly backed by the ring and thus positively held against displacement from their entered position within the latch socket 14, and consequently against release from their locking or holding relation to the male member. Since the slide ring 36 is held by a detent means against accidental retraction, it will be obvious that a very secure interlocked relation of the joined male and female coupling members is assured.

Having now described our invention, we claim:

1. A coupling comprising a male member having a spigot portion, said spigot portion having an external annular latch receiving channel, a female member having a bell portion to telescopically receive the spigot portion of said male member, said female member having transverse housing openings piercing opposite wall portions thereof to communicate with the bell portion interior, said housing openings terminating in flat seating faces disposed in transverse planes substantially parallel to the axis of the coupling, arcuate latch pieces radially movable in said housing openings, said latch pieces having at their opposite ends flat base faces opposed to the seating faces of said housing openings, the walls of said female member having socket cavities substantially perpendicular to and opening out of the seating faces at said housing opening ends, compression springs in said cavities adapted to respectively thrust against the respective base faces of said latch pieces to yieldably thrust the latter outwardly to released position flush with the inner surfaces of said female member bell portion, whereby the same are normally withdrawn from the path of movement of the male member spigot portion into and out of the bell portion of said female member, and a manipulative external slide ring mounted on said female member, said ring having an internal annular channel adapted, when said ring occupies a retracted position, to be aligned with and to receive the outwardly thrust latch pieces, said ring and latch pieces having co-operative cam portions operative to move said latch pieces into the receiving channel of the male member spigot portion entered in the female member bell portion when said ring is advanced, said ring, when advanced, being adapted to positively hold said latch pieces in such locking position.

2. A coupling as defined in claim 1 including an internal annular stop flange bounding the inner end of the female member bell portion, an annular packing ring seated against the back of said flange, said packing ring having a forwardly projecting flexible skirt portion extending over said flange to overhang the interior wall surfaces of said female member bell portion, and said male member spigot portion having an annular seat within its free end to receive said packing ring skirt, said seat being bounded by a shoulder adapted to guard the free edge of said skirt when said skirt is engaged in said seat.

3. A coupling comprising a male member having a spigot portion, said spigot portion having an external annular latch receiving channel, a female member having a bell portion to telescopically receive the male member spigot portion, said female member bell portion having a transverse housing opening piercing the wall thereof to communicate with its interior, said housing opening having flat seating faces at its ends disposed in transverse plane substantially parallel to the axis of the coupling, an arcuate latch piece radially movable in said housing opening, said latch piece having flat base faces at its ends opposed respectively to the respective seating faces of said housing opening, the wall of said female member bell portion having socket cavities substantially perpendicular to and respectively opening out from the said housing opening seating faces, compression springs in said cavities adapted to respectively thrust against the respective base faces of said latch piece, whereby to yieldably thrust the latter outwardly through said housing opening to normally dispose the inner arcuate surface of said latch piece flush with the internal surface of the female member bell-portion, and a manipulatable external slide ring mounted on said female member, said ring having an annular channel adapted, when said ring occupies a retracted position, to be aligned with and to receive the outwardly thrust latch piece, said ring and latch piece having cooperative cam portions operative to move said latch piece into the receiving channel of the male member spigot portion as entered in the female member bell portion when said ring is advanced, said ring, when advanced, being adapted to positively hold said latch piece in such locking position.

4. A coupling as defined in claim 3, including cooperative stop and detent means between said slide ring and female member operative to limit the movements of said ring and to releasably hold the same against accidental displacement from latch piece locking position.

5. A coupling as defined in claim 1, including cooperative stop and detent means between said slide ring and female member operative to limit the movements of said ring and to releasably hold the same against accidental displacement from latch piece locking position.

HOWARD C. KRONE.
WILLIAM MEYER.